Nov. 20, 1951 W. P. OZAROWSKI 2,576,077
WINDSHIELD WIPER
Filed May 18, 1948
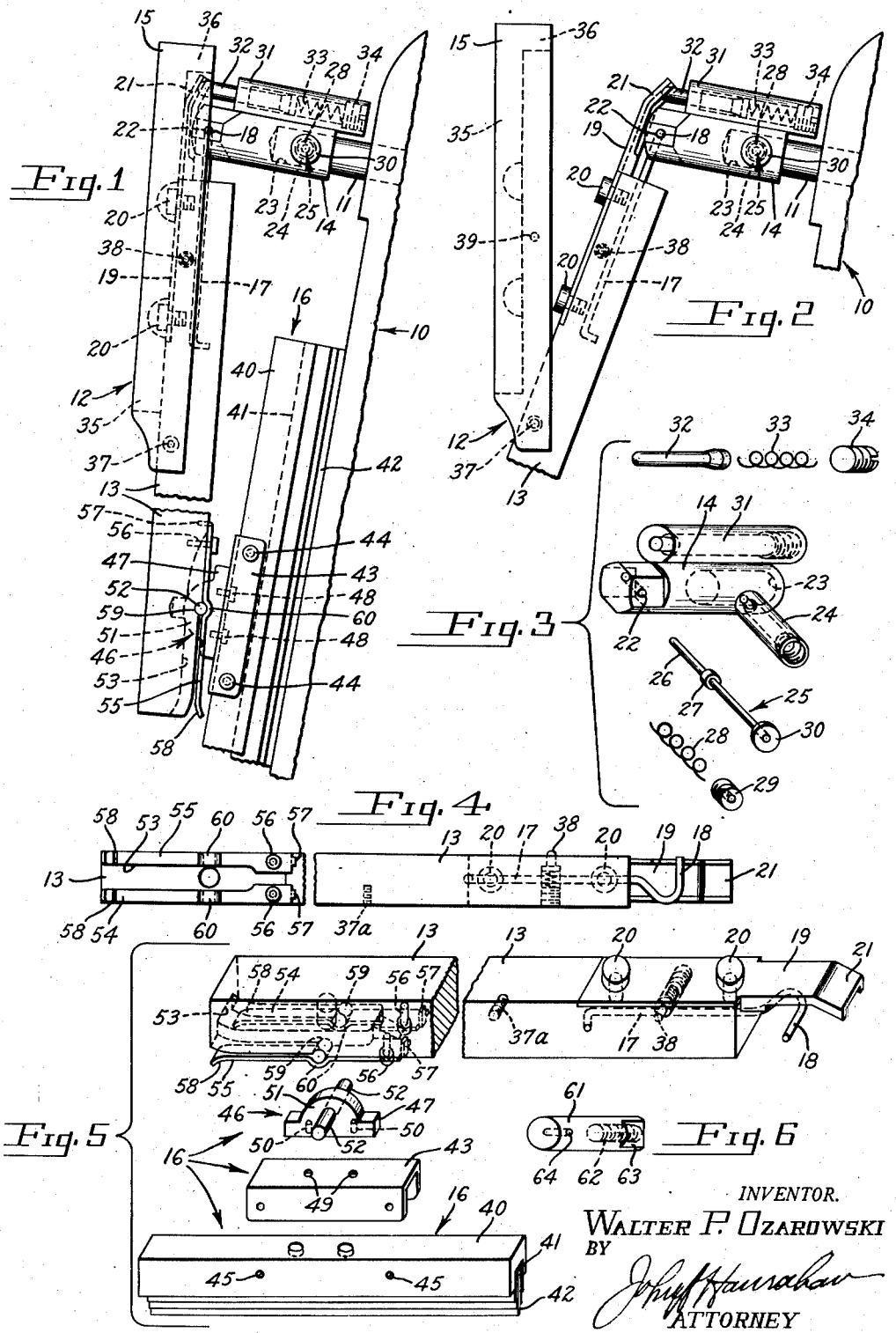
INVENTOR.
WALTER P. OZAROWSKI
BY
*Jny Hanrahan*
ATTORNEY Patented Nov. 20, 1951

2,576,077

UNITED STATES PATENT OFFICE 2,576,077

WINDSHIELD WIPER

Walter P. Ozarowski, Devon, Conn.

Application May 18, 1948, Serial No. 27,802

6 Claims. (Cl. 15—253)

This invention relates to new and useful improvements in windshield wipers.

An object of the invention is to provide a windshield wiper including an effective but simple means for mounting the wiper for operation by any of the usual motive means and whereby the wiper may be readily removed for replacement or repair.

Another object is to provide a windshield wiper including improved structure whereby the wiper blade is biased against the windshield to be wiped and including a simple structural arrangement whereby the pressure of the blade against the windshield may be readily adjusted.

A further object is to provide an improved but simple and inexpensive means whereby the wiper blade of a windshield wiper may be easily and conveniently mounted on or removed from the actuating arm of the wiper.

An additional object is to provide a windshield wiper blade including improved means for use in mounting such blade on the actuating arm of a windshield wiper.

Yet another object is to provide a windshield wiper including means whereby the wiper may be easily mounted and dismounted and also including a pivoted hood or cover means movable to a position at least partly enclosing the mounting means and serving to assist in maintaining it effective and to an inoperative position whereby the wiper may be readily dismounted from a vehicle.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a side elevational view of the windshield wiper of the invention shown as mounted for the wiping of a windshield, but a portion of which is illustrated;

Fig. 2 is a similar view of the upper mounting portion of the wiper, the hood being in an open position;

Fig. 3 is an exploded view showing various parts of the wiper;

Fig. 4 is an elevational view of the inner side of the wiper arm;

Fig. 5 is an exploded view of the wiper blade structure and the wiper arm, the parts being in perspective; and Fig. 6 is an isometric view of an adapter employed when the drive shaft of the windshield wiper is threaded.

Referring in detail to the drawing, at 10 is generally indicated a portion of a motor vehicle mounting the windshield (not shown) and a windshield wiper driving mechanism (not shown) the shaft 11 of the latter of which is oscillated when said mechanism is in use. My improved windshield wiper, generally designated 12, is mounted to be driven by the shaft 11 of any usual driving mechanism (not shown).

My improved wiper 12 includes an elongated blade driving arm 13, a coupling part 14 to which the arm 13 is connected and by which the arm 13 is given a back and forth swinging movement, a hood 15 and a wiper blade generally designated 16. The arm 13 is preferably of a transparent synthetic resin or the like molded into the desired shape and rigid with said arm and extending beyond the upper end thereof is a rod 17. Where the arm 13 is of a molded plastic or the like, the rod 17 may be molded right into the arm but extends through the upper end of the latter and beyond the arm has its end portion bent to provide a portion 18 extending transversely or laterally or crosswise of the arm.

Mounted on the outer side of the upper portion of the arm 13 is a flat spring device 19 having its lower portion rigidly secured to the arm as by screws 20 and having its upper portion extending a considerable distance beyond the bent end 18 of the rod 17 and slightly offset or inclined inwardly as at 21. The bent end portion 18 of the rod 17 passes through an opening 22 extending transversely through the solid outer end portion of the coupling part 14. In this way, the arm 13 is mounted on the part 14 for pivotal movement relative thereto in one plane but is fixed to the part to impart back and forth pendulum-like swinging movement to the arm 13 when the part 14 is oscillated due to its connection with the shaft 11, all as will appear.

When the bent end 18 of the rod is extended through the opening 22 in the coupling part, it is clear that the flat spring means 19 is extending across and above the outer end of said coupling part. Opening through the inner end of the coupling part 14 is a socket 23 of a diameter to conveniently receive the shaft 11. Extending laterally or radially from the inner portion of the coupling is a tubular means 24 through which extends a plunger 25 having an inner end portion 26 designed to extend transversely across the socket 23 and through a transverse hole in the received end portion of the shaft 11 whereby to key the part 14 to said shaft for oscillating movement with the latter.

Outwardly of the portion 26, the plunger 25 is provided with a collar 27 and a coil spring 28 surrounds the plunger outwardly of said collar 27 and at its inner end bears against the collar. A plug 29 threaded into the outer end of the extension 24 helps to centrally locate the plunger with respect to said tubular extension and provides a stop against which the outer end of the spring 28 engages. The tension of said spring will be regulated by threading the plug 29 more or less into the extension 24.

Preferably, the plunger includes an outer button-like head portion 30 for use in manually manipulating the plunger to withdraw its portion 26 from a position extending transversely of the socket 23 and through the mentioned opening in the shaft 11 whereby the windshield wiper may be removed from said shaft. Then to again mount the wiper on the shaft, the plunger is drawn outwardly and coupling 14 slipped over the shaft to align the inner end of the plunger with the mentioned hole through shaft 11 after which, on release of the plunger, spring 28 will function to shift the plunger inwardly to have it pass through the shaft and key the coupling to the latter.

On the upper side of the coupling part and, if desired, integral therewith is a barrel or tubular part 31 mounting a plunger 32 for movement through its outer end. Within said barrel is a coil spring 33 bearing at its forward end against the plunger and at its inner end against a plug 34 threaded into the inner end of the barrel. Clearly, the spring 33 constantly tends to keep the plunger projected through the forward end of the barrel and it will also be clear that the strength of the spring may be varied by adjusting the plug 34 more or less into the barrel.

At its forward end the plunger 32 bears against the inner side of the inwardly offset upper end portion 21 of the flat spring means 19. Thus, it will be understood that when the wiper is mounted on the shaft 11, the spring pressed plunger engaging the flat spring 19 tends to rock the driving arm 13 of the plunger about the pivotal connection, formed by the bent end 18 of the rod and the opening 22 of the coupling, in a direction to have the wiper blade 16 pressed against the windshield. The pressure of the blade on the windshield may be varied or adjusted by varying or adjusting the position of the plug 34 longitudinally of the barrel 31.

To cover and protect and partly conceal some of the above described mechanism, the hood 15 is provided. This hood is also preferably of a transparent plastic or resin and in transverse section is somewhat U-shaped whereby it is open at its inner side and includes opposite side walls and an outer wall 35 and an upper end wall 36. Hood 15 is pivotally mounted on the arm 13 as by a screw 37, the shank of which is threaded into a socket 37a in the arm. The hood is of a length and of a width so that in its closed position, as in Fig. 1, it receives the upper outer end portion of the arm 13 and the flat spring means 19, rod 17, a portion of the coupling 14 and of the plunger 32. Thus, these parts are concealed and are somewhat protected.

Additionally, since the hood in this position straddles the outer end portion of the coupling 14, lateral movement of the arm 13 with respect to the coupling, in the direction of the length of the bent end 18 of the rod 17, is prevented so that said rod portion may not move out of the opening 22 and the entire wiper arm and its parts are maintained operatively mounted on and connected with the coupling 14. The hood may be swung to an open position as suggested in Fig. 2 and at this time it will be seen that by moving arm 13 laterally in the direction of the length of the bent end 18 of the rod 17, such bent end may be withdrawn from the opening 22 and the wiper arm and its parts detached from the coupling part 14. This may be for repair or replacement of the removed wiper by another.

To maintain the hood in its closed position of Fig. 1, arm 13 is shown as mounting a spring pressed pin 38 which may engage in a dimple or recess 39 in the inner surface of a side wall of the hood when the latter is in a closed position. The described means is not intended as a lock but is merely intended as a means to prevent casual opening of the hood or casual movement of the hood to or toward the position of Fig. 2.

The wiper blade 16 comprises a back 40 of a stiff material. This back may be and preferably is formed of a suitable transparent plastic and, as shown, comprises an elongated body generally rectangular in transverse section and having a slot 41 opening through one longitudinal edge. A squeegee 42 is mounted in the channel 41 and extends outwardly therefrom and is also elongated and of substantially the length of the back 40. This squeegee, as shown, is made up of a number of flexible rubber strips of graduated widths with the strip of the greatest width comprising the center strip.

A saddle-like construction 43 comprising a channel member straddles the mid portion of the back 40 and is secured thereto as by means of screws 44 passing through the side walls of the saddle-like device and threaded into openings 45 in the back. Mounted on the outer or connecting wall of the device 43 is a mounting means generally designated 46 and comprising a block-like body 47 which rests against said outer wall of the saddle-like device and is secured thereto as by screws 48 passing through openings 49 in the outer wall of the saddle-like device and threaded into sockets 50 in the block.

Outwardly or above the block or body 47, the means 46 includes an arcuate portion 51 having flat sides from which project studs or journal elements 52. Such studs or journal elements 52 are in alignment and may comprise portions of the same rod or bar or may be separate pieces suitably anchored. From the above, it will be seen that the assembled blade 16 comprises the back 40 carrying the squeegee and the saddle-like device 43 secured to the back and in turn mounting the means 46.

In its inner side, toward its lower end, the drive bar 13 is provided with a slot 53 which opens through the lower end of the bar. Disposed on the lands or bar portions at each side of said slot are spring fingers 54 and 55. These fingers are secured in place as by screws 56 passing through the upper end portions of the fingers and preferably the fingers also have their extreme upper end portions bent upon themselves and imbedded in the stock of the bar 13 as at 57.

The fingers are of spring stock and clearly their portions below the screws 56 may flex with respect to the bar 13. The lower ends or the free ends of the fingers are preferably bent outwardly as at 58. The above described lands or the bar portions at the respective sides of the slot 53 are intermediate their ends provided with arcuate depressions or recesses 59 and opposite such depressions or recesses, the fingers 54 and 55 are outwardly offset, also in arcuate form, as at 60.

To assemble the wiper blade 16 on the arm 13, the studs or journals 52 are brought under the outturned ends 58 of the fingers 54 and 55 with the arcuate portion 51 of the means 46 aligned with the open end of the slot or groove or channel 53. Then by relative longitudinal movement of the wiper and the bar 13 toward one another, the studs or journals 52 are carried under the spring fingers 54 and 55 and snap into the recesses 59 with their outer sides engaged by the offset portions 60 of the fingers. In this way the wiper is secured to the bar 13 so as not to casually separate from the latter. However, the wiper may have a rocking movement on the journals or studs 52. Nevertheless, with the flat sided arcuate portion 51 of the means 46 between the flat sides of the groove or channel 53, lateral movement of the wiper blade relative to the arm 13 is impossible.

Therefore, it will be clear that as the arm 13 is swung back and forth in a back and forth pendulum-like swinging movement, on oscillation of the coupling 14, a similar movement will be imparted to the wiper blade 16. The spring pressed plunger 32 bearing against the inwardly offset end portion of the flat spring member 19, there is a tendency for the wiper arm 13 to rock on its pivotal connection with the coupling 14 whereby to thrust the squeegee 42 of the wiper blade against the windshield.

The described pivotal connection between the arm and the coupling is the result of the offset end portion 18 of the bar 17 passing through the opening 22 in the outer end portion of the coupling. When the wiper blade 16 is no longer fully useful, it may be detached from the arm 13 by a downward pull on the wiper blade or by pressure on the blade in the direction of its length. This forces the studs or pins 52 outwardly beneath the fingers 54 and 55 with the arcuate portion 51 of the means 46 passing downwardly through the groove or channel 53. Thus, it will be seen that the wiper blade is easily mounted on the arm 13 and is easily removed therefrom for replacement or the like.

Where the windshield wiper motor or motive means has a threaded shaft of smaller diameter than the shaft 11, or of any other diameter, an adaptor is threaded onto said shaft and then the coupling 14 mounted on said adaptor. Such an adaptor is shown in Fig. 6 and the same comprises a transversely circular bar portion 61 having a threaded socket 62 opening through one end to be threaded onto a threaded drive shaft. This body 61 may be provided with flats 63 to be engaged by a suitable wrench or the like for tightening the coupling on the drive shaft. Intermediate its ends, adaptor or body 61 is provided with a transverse opening 64 through which the locking portion 26 of the spring pressed plunger 25 may pass for keying the coupling 14 to the adaptor after the latter has been threaded onto a drive shaft.

Having thus set forth the nature of my invention, what I claim is:

1. In a windshield wiper, a drive arm, a coupling part for connection to a driving mechanism, a rod rigid with and projecting from one end of said arm and pivotally mounted on said coupling for a back and forth pendulum-like swinging movement by the coupling as the latter is oscillated by a driving mechanism and for pivotal movement relative to said coupling in a plane substantially normal to the plane of such back and forth swinging movement, a flat spring means fixed to said arm and extending beyond the upper end of said rod and above the outer end of said coupling part, and a spring pressed plunger at the upper side of said coupling part and bearing on the inner side of the upper end portion of said flat spring means above said coupling part for biasing said rod on said pivotal mounting and thereby biasing said drive arm for applying through said drive arm a pressure to a blade carried by the lower end portion thereof.

2. In a windshield wiper, a drive arm, a coupling part for connection to a driving mechanism, a rod rigid with and projecting from one end of said arm and pivotally mounted on said coupling for a back and forth pendulum-like swinging movement by the coupling as the latter is oscillated by a driving mechanism and for pivotal movement relative thereto in a plane normal to the plane of such back and forth pendulum-like swinging movement, a flat spring means fixed to said arm and extending beyond the upper end of said rod across and above the outer end of said coupling part, a spring pressed plunger at the upper side of said coupling part and bearing on the inner side of the upper end portion of said flat spring means above said coupling part for biasing said rod on said pivotal mount and thereby biasing said drive arm for applying through said drive arm a pressure to a blade carried by the lower end portion thereof, and manually adjustable means for varying the pressure of the spring of said spring pressed plunger for varying the pressure applied to the wiper blade through said drive arm.

3. In a windshield wiper, a drive arm, a coupling part for connection to a driving mechanism, a rod rigid with and projecting from one end of said arm and pivotally mounted on said coupling whereby the arm is pivoted on the coupling but for a back and forth pendulum-like swinging movement by the coupling as the latter is oscillated by a driving mechanism and for pivotal movement relative thereto in a plane substantially normal to the plane of such back and forth pendulum-like swinging movement, a flat spring means extending beyond said end of said arm and across the outer end of said coupling part, a spring pressed plunger bearing on the inner side of the upper end portion of said flat spring means above said coupling part for biasing said rod on said pivotal mount and thereby biasing said drive arm for applying through said drive arm a pressure to a blade carried by the lower end portion thereof, a hood, said hood open at its inner side and including opposite side walls, said hood of a length and width to receive the upper portion of said arm and said flat spring means and rod and the outer end of said spring pressed plunger, and means pivotally mounting said hood on said arm below the upper end thereof for pivotal movement from a position receiving said parts to a position exposing said parts.

4. In a windshield wiper, a drive arm, a coupling part for connection to a driving mechanism, a rod rigid with and projecting from the upper end of said arm, said rod having its upper end portion bent into substantially right-angular relation with said arm and passing through said coupling part whereby the arm is pivotally mounted on the coupling for movement relative thereto in one direction but for a back and forth pendulum-like swinging movement therewith in a direction at right angles to said direction as the coupling is oscillated by a driving mechanism, a hood mounted on said arm below the upper end thereof, said hood open at its inner side and including opposite side walls, said hood of a length and width to receive the upper outer end portion of said drive arm and said rod and the portion of the coupling through which the bent end of the rod extends whereby to prevent casual movement of such bent end out of said coupling part, and means pivotally mounting said hood on said arm below the upper end thereof for swinging movement from a position receiving said parts and preventing casual movement of such bent end out of said coupling part to a position exposing said parts to permit of movement of the bent end of the rod out of the opening through the coupling part.

5. In a windshield wiper, a drive arm, a coupling part for connection to a driving mechanism, a rod rigid with and projecting from the upper end of said arm, said rod having its upper end portion bent into substantially right-angular relation with said arm and passing through said coupling whereby the arm is pivotally mounted on the coupling for movement relative thereto in one direction but for a back and forth pendulum-like swinging movement therewith in a direction at right angles to said direction as the coupling part is oscillated by a driving mechanism, a flat spring means fixed to said drive arm and extending beyond the upper end thereof and across the outer end of said coupling part, a spring pressed plunger on the upper side of said coupling part and engaging against the inner side of the upper end portion of said flat spring means for applying therethrough and through said drive arm a pressure to a blade carried by the lower end portion of the latter, a hood mounted on said drive arm below said upper end thereof, said hood open at its inner side and including opposite side walls, said hood of a length and width to receive the upper outer portion of said arm and said flat spring means and rod and the outer end of said spring pressed plunger whereby to conceal said parts and prevent movement of the bent end of said rod from the opening in said coupling part, and means pivotally mounting said hood on said arm below the upper end thereof for swinging movement from a position receiving said parts and preventing movement of such bent end of the rod out of the opening in said coupling part to a position exposing said parts.

6. In a windshield wiper, a drive arm, a coupling part for connection to a driving mechanism, means at the upper end of said arms for pivotally mounting the latter on the coupling part for swinging movement relative thereto in one direction but for a back and forth pendulum-like swinging movement therewith in a direction at right angles to said direction as the coupling is oscillated by a driving mechanism, said means releasably engaging said coupling part, a hood open at its inner side and including opposite side walls and an outer wall, said hood of a length and width to receive the upper outer portion of said arm, the outer portion of said coupling, and the means pivotally connecting the arm on the coupling, and when in such position preventing release of said means from the coupling, and means pivotally mounting said hood on said arm for swinging movement from said position receiving said parts to a position exposing said parts whereby said means may be released from said coupling.

WALTER P. OZAROWSKI.

REFERENCES CITED

The following references are of record in the file of this patent:

UNITED STATES PATENTS

| Number | Name | Date |
|---|---|---|
| 1,658,312 | Trimble | Feb. 7, 1928 |
| 1,920,145 | Hueber | July 25, 1933 |
| 2,025,888 | Olivero | Dec. 31, 1935 |
| 2,376,012 | Sacchini | May 15, 1945 |
| 2,443,113 | Nesson | June 8, 1948 |